United States Patent
Booth et al.

(10) Patent No.: US 10,494,289 B2
(45) Date of Patent: Dec. 3, 2019

(54) METHODS AND APPARATUS FOR FABRICATING RESPECTIVE SECTIONS FROM A GLASS WEB

(71) Applicant: CORNING INCORPORATED, Corning, NY (US)

(72) Inventors: Robertson Dewhurst Booth, Elmira, NY (US); Douglas Edward Brackley, Horseheads, NY (US); Michael Vincent Ficarra, Pittsford, NY (US); Andrew Peter Kittleson, Honeoye Falls, NY (US); Gautam Narendra Kudva, Horseheads, NY (US); Eric Lee Miller, Corning, NY (US); Ian David Tracy, San Jose, CA (US)

(73) Assignee: Corning Incorporated, Corning, NY (US)

( * ) Notice: Subject to any disclaimer, the term of this patent is extended or adjusted under 35 U.S.C. 154(b) by 29 days.

(21) Appl. No.: 15/547,224

(22) PCT Filed: Jan. 22, 2016

(86) PCT No.: PCT/US2016/014449
§ 371 (c)(1),
(2) Date: Jul. 28, 2017

(87) PCT Pub. No.: WO2016/122972
PCT Pub. Date: Aug. 4, 2016

(65) Prior Publication Data
US 2017/0369356 A1 Dec. 28, 2017

Related U.S. Application Data

(60) Provisional application No. 62/109,234, filed on Jan. 29, 2015.

(51) Int. Cl.
*C03B 33/023* (2006.01)
*C03B 33/033* (2006.01)

(52) U.S. Cl.
CPC ........ *C03B 33/0235* (2013.01); *C03B 33/033* (2013.01)

(58) Field of Classification Search
None
See application file for complete search history.

(56) References Cited

U.S. PATENT DOCUMENTS

| 2,948,991 A | 8/1960 | Walters et al. |
| 3,107,834 A | 10/1963 | Huffman et al. |

(Continued)

FOREIGN PATENT DOCUMENTS

| CN | 1654380 A | 8/2005 |
| CN | 1250467 C | 4/2006 |

(Continued)

OTHER PUBLICATIONS

WO2013108568A1 Machine Translation WIPO website, Performed Nov. 2018. (Year: 2018).*

(Continued)

*Primary Examiner* — Lisa L Herring
(74) *Attorney, Agent, or Firm* — Jeffrey A. Schmidt; Ryan T. Hardee (57) ABSTRACT

Methods and apparatus provide for: conveying a glass web from a source toward a destination in a transport direction; scoring the glass web in a width direction thereof to produce a score line having a plurality of separated score segments, thereby defining a section of the glass web between the score line and a leading edge of the glass web; supporting the glass web such that an increasing portion of the section of the glass web becomes cantilevered as the glass web is conveyed such that the portion of the section of the glass web (Continued)

is sufficiently large to generate stress in the respective score segments and drive respective cracks through the thickness of the glass web; and permitting the section of the glass web to separate from the glass web along the score line.

19 Claims, 5 Drawing Sheets

(56) References Cited

U.S. PATENT DOCUMENTS

| | | | |
|---|---|---|---|
| 3,253,756 | A | 5/1966 | Haley et al. |
| 4,049,167 | A | 9/1977 | Guissard |
| 6,502,423 | B1 | 1/2003 | Ostendarp et al. |
| 7,079,216 | B2 | 7/2006 | Yamazaki et al. |
| 7,128,250 | B2 | 10/2006 | Luiz |
| 7,371,431 | B2 | 5/2008 | Dietz et al. |
| 7,461,564 | B2 | 12/2008 | Glaesemann |
| 7,975,581 | B2 | 7/2011 | Benischke et al. |
| 8,963,808 | B2 | 2/2015 | Collier |
| 9,034,458 | B2 | 5/2015 | Li |
| 9,290,407 | B2 | 3/2016 | Barefoot et al. |
| 9,707,741 | B2 | 7/2017 | Chowdhury et al. |
| 2012/0247154 | A1 | 10/2012 | Abramov et al. |
| 2013/0126576 | A1* | 5/2013 | Marshall ............... C03B 33/033 225/2 |
| 2013/0133809 | A1 | 5/2013 | Kondo |
| 2014/0123709 | A1 | 5/2014 | Joseph, II et al. |
| 2014/0130649 | A1 | 5/2014 | Chang et al. |
| 2014/0176848 | A1* | 6/2014 | Gupta ................ C03B 33/0222 349/58 |
| 2015/0218034 | A1 | 8/2015 | Bigelow et al. |
| 2015/0259236 | A1 | 9/2015 | Marshall et al. |
| 2015/0299019 | A1 | 10/2015 | Fujii et al. |
| 2016/0137543 | A1 | 5/2016 | Abramov et al. |
| 2017/0225997 | A1* | 8/2017 | Meng .................... C03B 33/033 |

FOREIGN PATENT DOCUMENTS

| | | |
|---|---|---|
| CN | 201176418 Y | 1/2009 |
| CN | 102442763 A | 5/2012 |
| CN | 102596439 A | 7/2012 |
| CN | 202622513 U | 12/2012 |
| CN | 103269989 A | 8/2013 |
| GB | 759359 A | 10/1956 |
| GB | 985270 A | 3/1965 |
| JP | 50030354 Y2 | 9/1975 |
| JP | S58115035 A | 7/1983 |
| JP | 2010006665 A | 1/2010 |
| JP | 2012096936 A | 5/2012 |
| JP | 2012136413 A | 7/2012 |
| JP | 2014101269 A | 6/2014 |
| KR | 1265499 B1 | 5/2013 |
| WO | 2013108568 A1 | 7/2013 |
| WO | 2013180463 A1 | 12/2013 |
| WO | 2014051984 A1 | 4/2014 |
| WO | 2015098768 A1 | 7/2015 |

OTHER PUBLICATIONS

Amano et al; "Basic Investigation of Noncontact Transportation System for Large TFT-LCD Glass Sheet Used in CCD Inspection Section"; Precision Engineering; 35 (2011), 58-64.

International Search Report and Written Opinion of the International Searching Authority; PCT/US2016/014449; dated Apr. 29, 2016; 12 Pages; European Patent Office.

English Translation of TW105102373 Office Action and Search Report dated Feb. 22, 2019, Taiwan Patent Office, 2 Pgs.

* cited by examiner

METHODS AND APPARATUS FOR FABRICATING RESPECTIVE SECTIONS FROM A GLASS WEB

CROSS-REFERENCE TO RELATED APPLICATIONS

This application claims the benefit of priority under 35 U.S.C. § 371 of International Patent Application Serial No. PCT/US16/14449, filed on Jan. 22, 2016, which in turn, claims the benefit of priority of U.S. Provisional Patent Application Ser. No. 62/109,234 filed on Jan. 29, 2015, the contents of each of which are relied upon and incorporated herein by reference in their entireties.

BACKGROUND

The present disclosure relates to methods and apparatus for fabricating respective sections from a glass web.

Continuous processing of ultra-thin glass web is a relatively new field and presents a number of manufacturing challenges. A conventional process includes providing a glass web and then cutting the glass web into appropriately sized widths and lengths. One example of a process for producing the glass web is a down draw process, which may result in a glass web characterized by a first beaded lateral edge (and an associated lateral zone along one edge of the glass web), a second beaded lateral edge (and associated lateral zone along an opposing edge of the glass web), and a central zone disposed between the first and second beaded lateral edges. The down draw process may cause the first and second beaded edges (and associated zones) to have thicknesses, mechanical characteristics, and/or optical characteristics that are significantly different from the central zone of the glass web. As the aforementioned characteristics of the central zone are often considered more desirable, the fabrication process typically involves removing the first and second beaded edges (and associated zones), thereby leaving the central zone for producing final products.

Conventional approaches for separating the first and second beaded edges (and associated zones), processing such portions for re-melt, and/or cutting the central zone into appropriate lengths for final products are far from optimum, particularly when ultra-thin glass web is involved. Accordingly, there are needs in the art for new methods and apparatus for processing the glass web.

SUMMARY

The present disclosure relates to separating ultra-thin glass web into respective segments or sections (of particular widths and lengths) and managing the processing of waste pieces of the glass web, such as any beaded edges (and associated zones) that are separated from a more desirable central portion or zone of the glass web. Indeed, final piece parts delivered to customers often must exhibit very fine, edges, with minimal particles, edge defects and/or edge corner defects. A cutting technique may be employed to remove the first and second beaded edges (and zones) from the glass web either before or after the central portion of the glass web is cut into sections.

The aforementioned processing of the glass web should not impact upstream or downstream processes, which is not a simple matter, particularly when ultra-thin glass web is being processed. It is challenging to simultaneously achieve a number of desirable features, including: (i) high glass utilization during the process, (ii) efficient use of the continuous transport process (i.e., eliminating multiple passes), and (iii) capability of producing a variety of section lengths. Indeed, while meeting the above features would result in manufacturing cost reductions, the techniques required to achieve such features in practice are not available in conventional systems.

In accordance with one or more embodiments herein, new methods and apparatus have been developed in which cross-width separation of the glass web into respective segments or sections of desired lengths and collection of the waste glass (e.g., beaded edges) may be achieved in a continuous transport process. The ultra-thin glass web, due to its characteristics of high modulus, notch sensitivity and brittleness, requires very consistent and symmetrical stress and strain fields in the vicinity of the zone in which the cross-width separation occurs in order to exhibit suitable edge characteristics (that is, having minimal strength reducing flaws). Therefore, in order to separate the glass web into multiple segments, a continuous transport and support system must provide consistent and symmetric stress fields and strain fields in the area(s) of separation. In accordance with one or more embodiments herein, the transport and separating mechanisms are carefully and independently controlled in order to achieve the consistent and symmetric stress and strain fields at separation, which results in a very fine edge with a minimal amount of particles thereon, which minimizes edge and/or edge corner defects.

Advantages and benefits of one or more embodiments herein include any of the following:

(i) Vibration of the glass web during conveyance and cutting is attenuated. Due to the characteristics of a unique scoring process, a reduced amount of bending stress may be employed to separate the glass web into respective sections, which reduces vibrations and overall process upsets;

(ii) Reduction of system upsets and improved reliability may result by way of process isolation techniques. Upstream and downstream rollers may be employed to achieve isolation in, and highly controlled, propagation of the aforementioned scoring flaws (crack propagation) as well as vibration isolation from upstream processes;

(iii) High variability in glass web thicknesses may be permitted. For example, one process setup may be employed to score and bending/separate segments from glass web of 350 um (micrometers, or microns, simply referred to as um herein for simplicity) to 100 um; and (iv) Process tuning permits adjustments in numerous process parameters, such as score path adjustment, score head pressure adjustment, and score frequency adjustment—resulting in very fine edge having a high quality and minimized particles, edge and/or edge corner defects.

In accordance with one or more embodiments, methods and apparatus provide for: (a) sourcing a glass web, the glass web having a length, a width that is transverse to the length, and a thickness; (b) scoring the glass web in a direction of the width thereof to produce a score line having a plurality of separated score segments, thereby defining a section of the glass web between the score line and a leading edge of the glass web; (c) conveying the glass web from the source toward a destination in a transport direction parallel to the length of the glass web to a bending zone; (d) supporting the glass web such that an increasing portion of the section of the glass web becomes cantilevered as the glass web is conveyed and the portion of the section of the glass web is permitted to droop under gravity, and continuing the conveying such that the portion of the section of the glass web is sufficiently large to generate stress in the respective score segments and drive respective cracks through the thickness of the glass web; (e) permitting the section of the glass web to separate from the glass web along the score line; and (f) repeating steps (a) through (e) to produce a plurality of sections of glass web.

Other aspects, features, and advantages will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the embodiments disclosed and described herein are not limited to the precise arrangements and instrumentalities shown.

DETAILED DESCRIPTION OF THE PREFERRED EMBODIMENTS

With reference to the drawings wherein like numerals indicate like elements there are shown in FIGS. 1A, 1B, and 1C top schematic views of a glass web 10 illustrating a number of techniques for separating the glass web 10 into respective segments or sections. For purposes of discussion, it is assumed that the glass web is relatively thin, and possibly ultra-thin. For example, a thickness of the glass web 10 may be one of: (i) about 50 um or greater; (ii) from about 100 um to about 500 um; (iii) from about 100 um to about 350 um; (iv) about 100 um; and (v) from about 50 um to about 100 um.

Figure 1A:
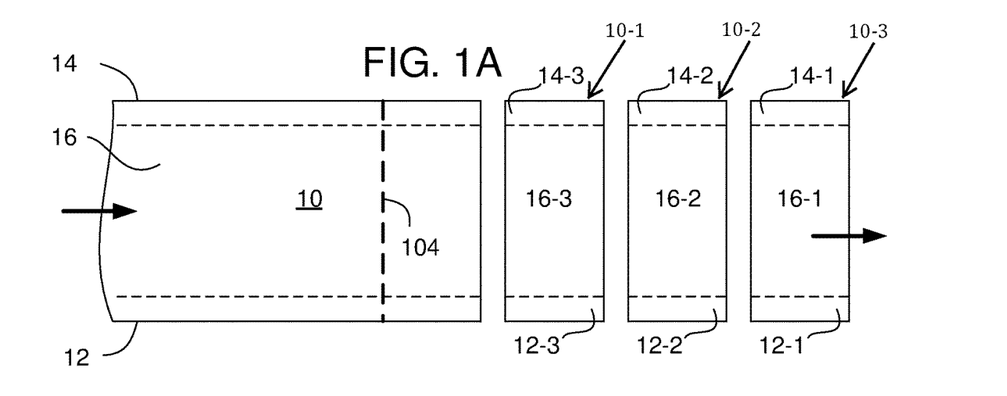
FIG. 1A is top schematic view of a glass web illustrating a first technique for separating the glass web into respective sections.
Figure 1B:
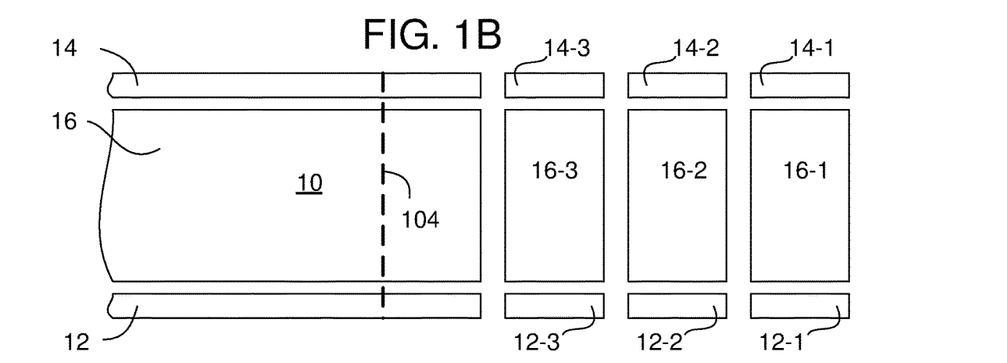
FIG. 1B is top schematic view of a glass web illustrating a second technique for separating the glass web into respective sections.
Figure 1C:
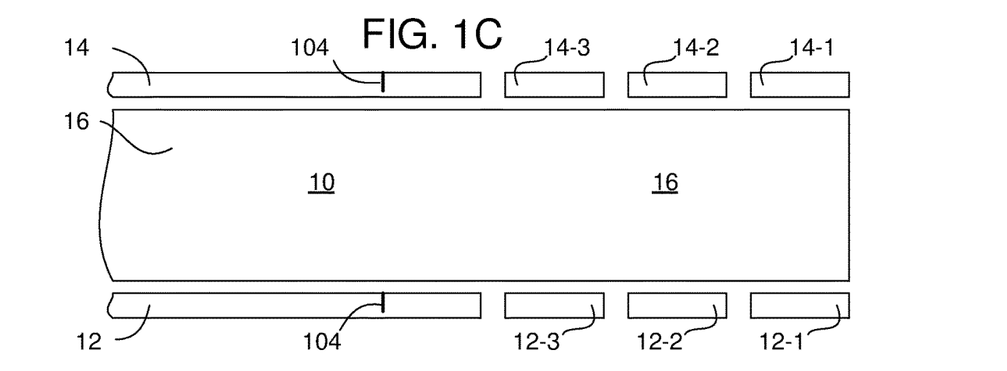
FIG. 1C is top schematic view of a glass web illustrating a third technique for separating the glass web into respective sections.

By way of example, and for the purposes of discussion, the glass web 10 is assumed to have a pair of opposed edge portions 12, 14 (which may have beaded, thickened, or otherwise undesired edges, that may include some width of material or associated zone of material adjacent thereto), and a central portion (or zone) 16 spanning between the opposed edge portions 12, 14. Although the glass web 10 may be provided via a wide range of sources, one such source is a down draw glass forming apparatus (not shown). A fusion down draw process includes a trough having a forming wedge that permits molten glass to overflow the trough and flow down opposite sides of the forming wedge, where the respective flows are subsequently fused together as they are drawn off the forming wedge. This fusion down drawn process may produce the glass web 10. Such a down draw fusion process, however, produces the edge portions 12, 14 of the glass web 10 in such a way that there are formed corresponding beads of thicknesses that are typically greater than a thickness of the central portion 16 of the glass web 10. Other sources of forming the glass web may include, for example, slot draw, up-draw, rolling, and float, forming processes.

Additionally or alternatively, the glass web 10 may be sourced from a coiled spool (not shown), where the glass web 10 is first wound onto the spool following its fabrication (which may have been achieved via the fusion down draw process or any other suitable method). When a coiled spool is employed, the coil would typically be provided with a relatively large diameter to present a relatively low bending stress to accommodate the characteristics of the glass web 10. Once coiled, the glass web 10 may be uncoiled from the coiled spool and introduced into the process.

In terms of the discussion herein, the glass web is assumed to be sourced from the left side of FIGS. 1A, 1B, 1C and transported or conveyed toward a destination zone (not shown) at the right side. The destination zone may include any suitable mechanisms for accumulating respective sections of the glass web 10 and/or spooling the central zone 16 of the glass web 10 as will be discussed in more detail below.

With particular reference to FIG. 1A, the illustrated technique involves a glass web 10 that includes the first and second lateral edges (and associated lateral zones) 12, 14, and the central zone 16 disposed therebetween—and specifically where the lateral edges 12, 14 have not been separated from the central portion 16 of the glass web 10. In this scenario, sections 10-1, 10-2, 10-3, etc., are separated from the glass web 10, such that each section 10-$i$ is an integral section having: (i) a section of the first lateral edge 12 and associated lateral zone; (ii) a section of the second lateral edge 14 and associated lateral zone; and (i) a section of the central zone 16 therebetween. A downstream process may then be employed to further process each section 10-$i$, such as to cut the respective pairs of first and second lateral edge sections 12-$i$, 14-$i$ from the respective central portions 16-$i$, thereby producing the desired segments 16-$i$ of the glass web 10.

With particular reference to FIG. 1B, the illustrated technique involves a glass web 10 whereby the lateral edges 12, 14 (and associated lateral zones) have been separated from the central portion 16 of the glass web 10 in an upstream process (not shown). In this scenario, sections 10-1, 10-2, 10-3, etc., are separated from the glass web 10, such that each section 10-$i$ includes three separate sub-sections: (i) a section 12-$i$ of the first lateral edge 12 and associated lateral zone; (ii) a section 14-$i$ of the second lateral edge 14 and associated lateral zone; and (i) a section 16-$i$ of the central zone 16 therebetween. As the desired segments 16-$i$ of the glass web 10 are obtained directly, there is no need for a downstream process to remove the respective pairs of first and second lateral edge sections 12-$i$, 14-$i$ from each section 10-$i$. Furthermore, the first and second lateral edge sections 12-$i$, 14-$i$ may be directed to a re-melt process (not shown) whilst the central section 16-$i$ may be directed to downstream processes and final product configuration.

With particular reference to FIG. 1C, the illustrated technique also involves the glass web 10 whereby the lateral edges 12, 14 (and associated lateral zones) have also been separated from the central portion 16 of the glass web 10. In this scenario, respective sections are separated from the glass web 10, however, each section 10-*i* includes only two separate sub-sections: (i) a section 12-*i* of the first lateral edge 12 and associated lateral zone; and (ii) a section 14-*i* of the second lateral edge 14 and associated lateral zone. Notably, a segment is not taken from the central section 16 of the web 10; rather, the central section 16 is spooled in the destination zone and/or subject to other downstream processing. The first and second lateral edge sections 12-*i*, 14-*i* may be directed to a re-melt process (not shown).

Figure 2A:
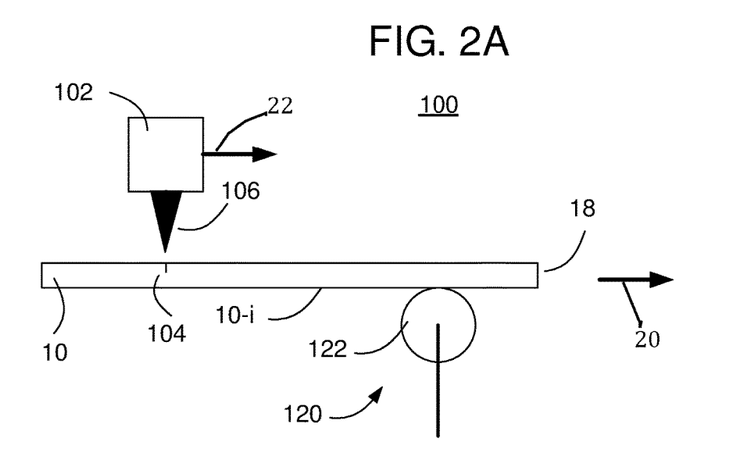
FIGS. 2A and 2B are side, schematic views of an apparatus for scoring and separating the glass web into respective sections.
Figure 2B:
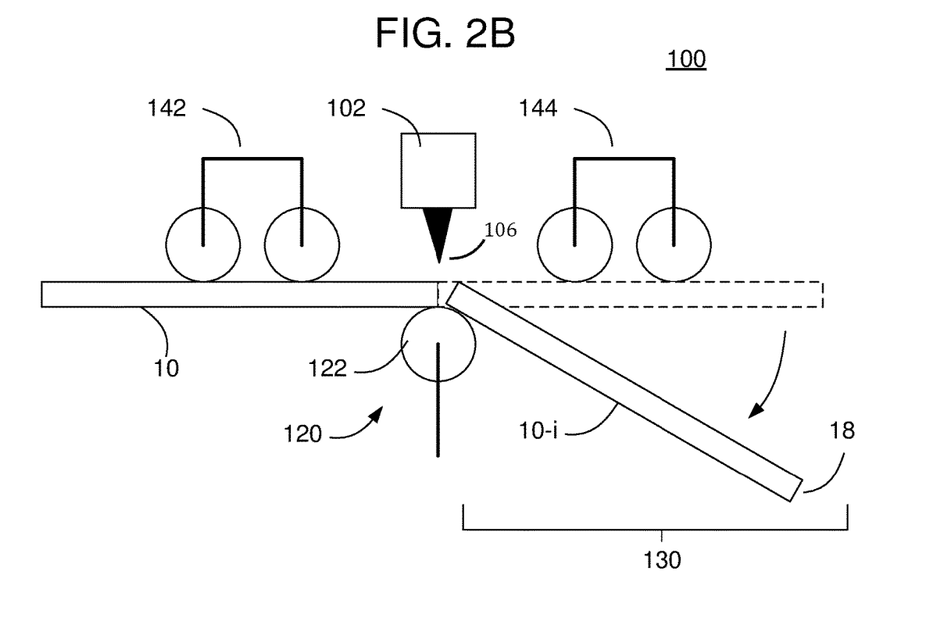

Reference is now made to FIGS. 2A and 2B, which are side, schematic views of an apparatus 100 for scoring and separating the glass web 10 into respective sections.

The apparatus 100 includes a transport mechanism (omitted for clarity) configured to convey the glass web 10 from the source mechanism toward the destination zone in a transport direction (indicated by arrow 20) parallel to the length of the glass web 10. The transport mechanism may include a number of individual elements that cooperate to continuously move the glass web 10 from the source to the destination, preferably without degrading the desirable characteristics of the glass web 10 and/or the respective segments, particularly the central segments 16-*i*.

For example, the transport mechanism may include any number of noncontact support members, contact support members, rollers, etc., to guide the glass web 10 and/or the segments 12-*i*, 14-*i*, and/or 16-*i* through the system from the source to the destination. The non-contact support members may be flat and/or curved in order to achieve desirable directional conveyance of the respective work pieces, such as including fluid bar(s), low friction surface(s), etc., in order to ensure that the glass web 10 and/or segments 12-*i*, 14-*i*, 16-*i* are suitably conveyed through the system without damage or contamination. Such fluid bars may include a plurality of passages and ports configured to provide a positive fluid pressure stream (such as air), and/or a plurality of passages and ports configured to provide a negative fluid pressure stream, to associated surfaces of the glass web 10 and/or segments 12-*i*, 14-*i*, 16-*i* in order to create an air cushion for such noncontact support. A combination of positive and negative fluid pressure streams, and/or rollers may stabilize the glass web 10 during transport through the system.

Optionally, a number of lateral guides (not shown) may be employed proximate to the edge portions 12, 14 of the glass web 10 to assist in orienting the glass web 10 in a desired lateral position relative to the transport direction 20. For example, the lateral guides may be implemented using rollers configured to engage a corresponding one of the opposed edge portions 12, 14 of the glass web 10. Corresponding forces applied to the edge portions 12, 14 by the corresponding lateral guides may shift and align the glass web 10 in the proper lateral orientation as the glass web 10 is conveyed through the apparatus.

As illustrated in FIGS. 2A and 2B, the apparatus 100 includes a scoring mechanism 102 configured to score the glass web 10 in a direction of the width thereof to produce a score line 104 having a plurality of separated score segments, thereby defining a section 10-*i* of the glass web 10 between the score line and a leading edge 18 of the glass web 10. Notably, the score line 104 is not a continuous line across the glass web 10, but rather a plurality of relatively short segments. For example, the scoring mechanism 102 may be configured such that lengths of one or more of the score segments of the score line are one of: (i) from about 1 to about 30 inches (2.5 to 75 cm); (ii) from about 2 to about 20 inches (5 to 50 cm); (iii) from about 3 to about 10 inches (7.5 to 25 cm); and (iv) from about 4-8 inches (10 to 20 cm).

Additionally and/or alternatively, the scoring mechanism 102 may be configured such that lengths of one or more intervals between respective score segments of the score line are one of: (i) from about 1 to about 30 inches (2.5 to 75 cm); (ii) from about 2 to about 20 inches (5 to 50 cm); (iii) from about 3 to about 10 inches (7.5 to 25 cm); and (iv) from about 4-8 inches (10 to 20 cm). The separated score segments may be located in any one or more of the portions 12, 14, 16. For example, a score line may include one or more score segments in portion 12, and/or one or more score segments in portion 14, and/or one or more score segments in portion 16.

In preferred embodiments, the scoring mechanism 102 includes a conveyance or mechanism (schematically illustrated by arrow 22 in FIG. 2A) that is configured to move the scoring mechanism 102 in the transport direction 20 at substantially the same rate as the glass web 10 is conveyed, such that, as the transport mechanism conveys the glass web 10 in the transport direction 20, the scoring mechanism 102 operates to score the glass web 10 in the cross-width direction (transverse to the transport direction, and for example in the direction perpendicular to the plane of the paper in FIG. 2A) and to produce the score line 104 simultaneously with the conveyance of the glass web 10.

Figure 3:
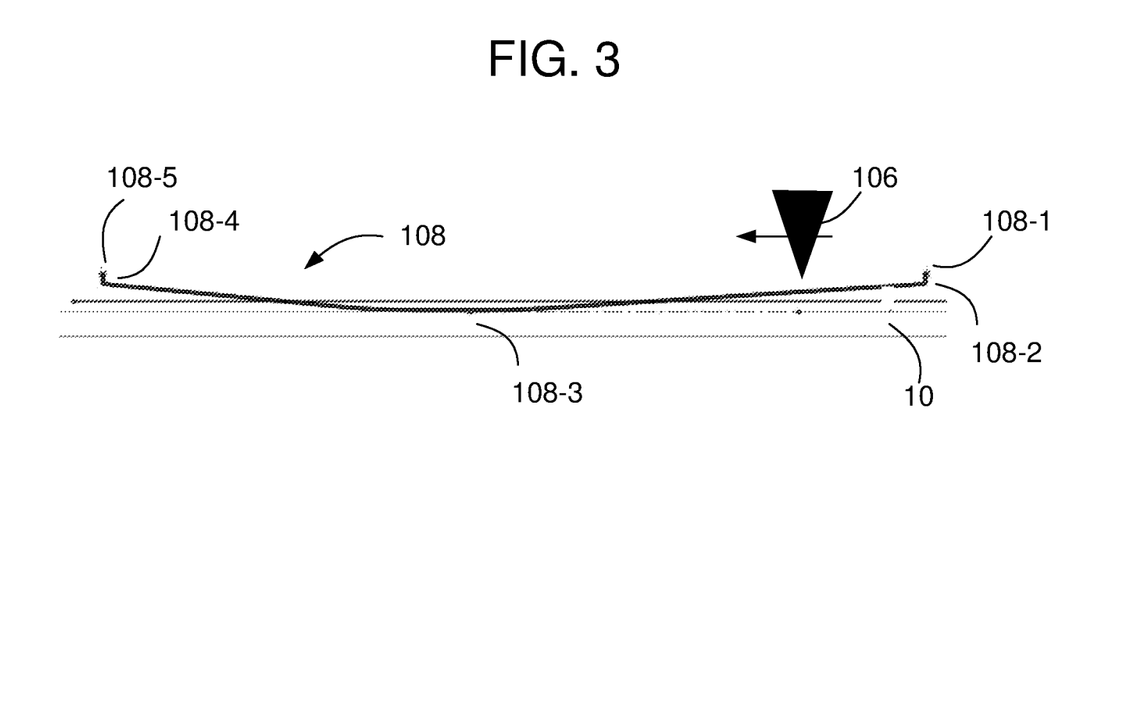
FIG. 3 is a graphical illustration of a path that a score head of the apparatus may take in producing one segment of an overall score line across the glass web.

Reference is now made to FIG. 3, which is a graphical illustration of a path 108 that a score head 106 of the scoring mechanism 102 may take in producing one segment 104-1 of the overall score line 104 across the glass web 10. The path 108 may be traversed in a direction (illustrated by the arrow) that initiates at or near the central positions of the glass web 10 toward the lateral edges of the glass web 10 (i.e., transverse to the transport direction 20 of the glass web 10). Thus, the viewing direction of FIG. 3 is directed toward the leading edge 18 of the glass web 10. As shown, the path 108 may be defined as follows: (i) the score head 106 may originate at a start position 108-1 at a relatively elevated level above the glass web 10; (ii) then the score head 106 may step down to an intermediate position 108-2 above the glass web 10; (iii) then the score head 106 may slew toward, and into, the top surface of the glass web 10 to a maximum depth position 108-3; (iv) then the score head 106 may slew in a reverse direction away from, and out of, the top surface of the glass web 10 to another intermediate position 108-4; and (v) then the score head 106 may step up to the start position 108-5 again.

The particular parameters of the path 108 are preferably adjustable such that the user may make tuning adjustments to the process. For example, the slewing parameters may be characterized by a rate of lowering/raising the score head 106 and a rate of moving the score head 106 in the cross-width direction. Skilled artisans will appreciate that the scoring mechanism 102 may be designed in such a way to permit adjustment(s) to one or both of these rates. By way of example, the rate of moving the score head 106 in the cross-width direction may be within the range of about equal to the rate of transporting the glass web 10, to ten or twenty times such rate. In the illustrated example, the slew parameter of the path 108 plots as about a four degree drop into the glass web 10 toward the position 108-3, and a steeper climb out of the glass web 10 from the position 108-3 to the position 108-4. The depth parameter of the scoring head 106 may be such that the depths of one or more of the score segments of the score line 104 are one of: (i) from about 2 to about 20 um; (ii) from about 5 to about 15 um; (iii) about 10 um; and from about 2 to about 40% of the thickness of the glass web 10. Again, skilled artisans will appreciate that the scoring mechanism 102 may be designed in such a way to permit adjustment(s) to the scoring depth.

The above path 108 of the score head is preferably performed repeatedly in order to produce a plurality of score segments of the score line 104. The number and/or pitch of the score segments may be adjusted by adjusting the aforementioned rates of lowering/raising the score head 106 and moving the score head 106 in the cross-width direction.

As noted above, the apparatus 100 may produce the segments 12-$i$, 14-$i$, and/or 16-$i$ in accordance with the various techniques shown in FIGS. 1A, 1B, and/or 1C. Thus, when the segments 10-$i$ are to be integral sections having a section 12-$i$, a section 14-$i$, and a section 16-$i$ therebetween, the scoring mechanism 102 preferably produces a segmented score line 104 in all three sections of the glass web 10. Alternatively, when the segments 10-$i$ are to be three separate sub-sections having a sub-section 12-$i$, a sub-section 14-$i$, and a sub-section 16-$i$, the scoring mechanism 102 also preferably produces a segmented (and separate) score line 104 in each such sub-section of the glass web 10. Alternatively, when the segments 10-$i$ are to be two separate sub-sections having a sub-section 12-$i$ and a sub-section 14-$i$ (but no sub-section 16-$i$), the scoring mechanism 102 only produces a segmented (and separate) score line 104 in each such of sub-sections 12-$i$ and 14-$i$ of the glass web 10, but does not score the central section 16 of the glass web 10.

Again, as illustrated in FIG. 2A, the transport mechanism conveys the glass web 10 toward the destination in the transport direction 20 to a bending zone. In particular, as illustrated in FIG. 2B, the apparatus 100 includes a support mechanism 120 configured to support the glass web 10 such that an increasing portion of the glass web 10 becomes cantilevered as the glass web 10 is conveyed. For example, the support mechanism may include a roller 122 (or other elongate support) that permits the leading edge 18 of the glass web 10 to extend past the roller 122 and thereby define a cantilevered portion of the section 10-$i$ of the glass web 10. The conveyance of the glass web 10 by the transport mechanism produces an ever increasing portion of the section 10-$i$ that is cantilevered. The cantilevered portion of the section 10-$i$ of the glass web 10 is permitted to droop under the influence of gravitational forces. Continuing the conveying of the glass web 10 such that the portion of the section 10-$i$ of the glass web 10 is sufficiently large eventually generates sufficient stress in the respective score segments of the score line 104 and drives respective cracks through the thickness of the glass web 10. The amount of cantilever to drive the crack through the thickness of the glass will depend upon the weight of the portion cantilevered (based on glass thickness, glass density, width of the portion, and length of the cantilever), and the propensity of cracks to propagate through the particular glass composition. Accordingly, the timing of making score lines 104 (and thus the distance between score lines 104) can be determined to provide a suitable cantilevered portion that will drive the score through the thickness of the particular glass being processed.

The apparatus 100 also includes a separating zone 130 configured to permit the section 10-$i$ of the glass web 10 to separate from the glass web 10 along the score line 104. A controller (which may be computer implemented) may be employed to interface electronically with the transport mechanism and the scoring mechanism 102 such that the sourcing, scoring, conveying, supporting, and separating is repeated to produce a plurality of sections 10-$i$ of glass web 10.

Optionally, the apparatus 100, particularly the transport mechanism, may employ components to mitigate some effects that the bending and separation may have on edge quality. Specifically, to the extent that such bending may tend to cause cracks to propagate in the transport direction 20 (rather than the cross-width direction across the glass web 10), an isolation roller system may be employed. In particular, rollers 142 may be placed upstream of the scoring head 106, and rollers 144 may be placed downstream of the scoring head 106 to provide an alternative stress path for the cracks. Additionally the isolation rollers 142, 144 may be used to mitigate vibrations from traveling upstream in the glass web 10.

Figure 4A:
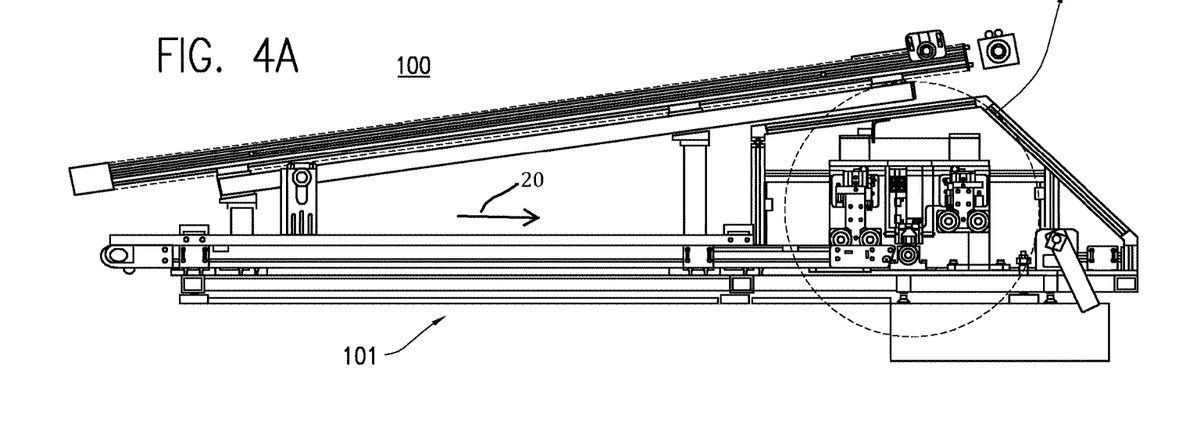
FIGS. 4A and 4B are side, schematic illustrations of the apparatus of FIGS. 2A-2B showing more details of the overall structure.
Figure 4B:
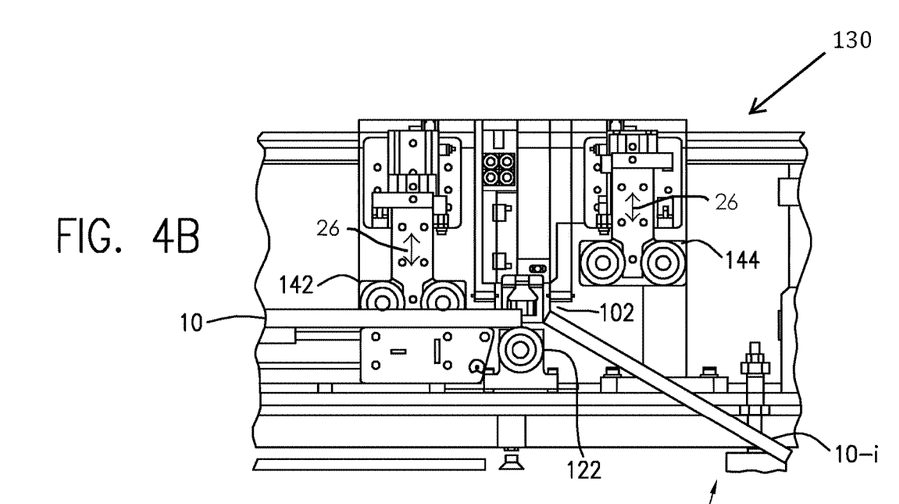
Figure 5A:
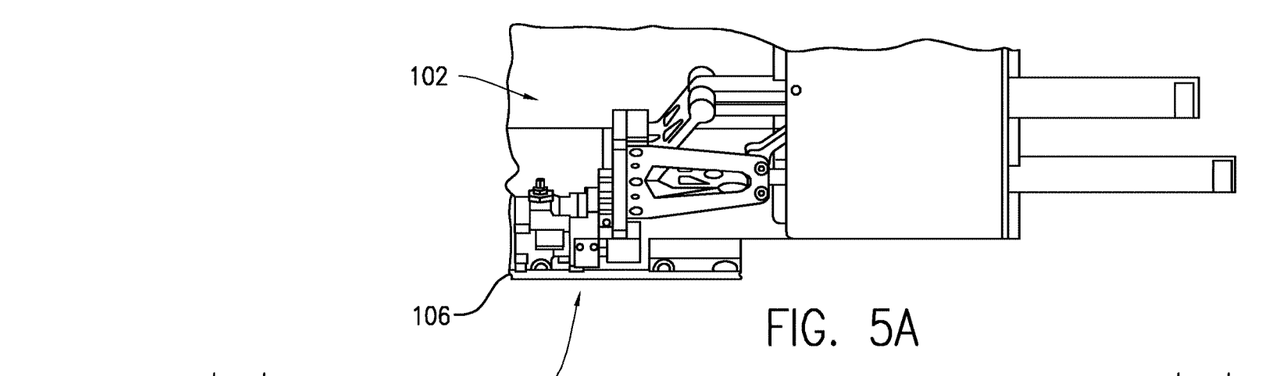
FIGS. 5A and 5B are top, schematic illustrations of the apparatus of FIGS. 2A-2B showing more details of the overall structure.
Figure 5B:
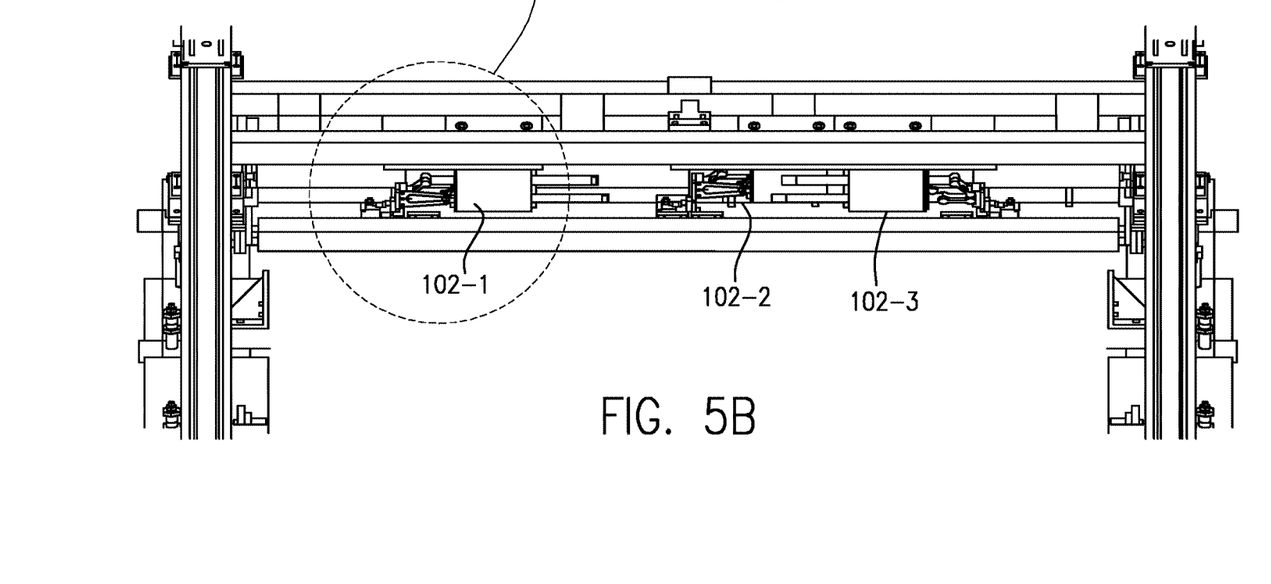

FIGS. 4A and 4B are side, schematic illustrations of the apparatus 100 of FIGS. 2A-2B showing more details of the overall structure. In particular, FIG. 4A shows that the apparatus 100 includes the transport mechanism 101 that operates to convey the glass web 10 (not shown) in the transport direction 20. The scoring mechanism 102, support mechanism 120 (e.g., the roller 122), and the separating zone 130 are shown in an enlarged format in FIG. 4B. Notably, structures for moving the scoring mechanism 102 (specifically the scoring head 106) up and down and in transverse directions are illustrated as would be apparent to skilled artisans. Further, the respective isolation rollers 142, 144 are illustrated as being movable up/down (as indicated by arrows 26) as may be needed to achieve the aforementioned functionality, by being brought into proximity or contact with the glass web 10 or desired portions across the width thereof. FIGS. 5A and 5B are top, schematic illustrations of the apparatus of FIG. 4A, showing additional details of the overall structure. As illustrated in the enlarged section of FIG. 4B, further details concerning the structures for moving the scoring head 106 up and down and in transverse directions are shown.

Still further, a preferred embodiment is illustrated in FIG. 5A, whereby the scoring mechanism includes at least three scoring mechanisms 102-1, 102-2, and 102-3. For example, the first scoring mechanism 102-1 may operate to produce a section of the segmented scoring line 104 that extends from within the central section 16 of the glass web 10 toward the first lateral edge 12 of the glass web 10 (as may be used in the configuration of FIG. 1A). Alternatively, if the first lateral edge 12 (and associated zone) is already separated from the central section 16, as in FIG. 1B, then the first scoring mechanism 102-1 may operate to produce a section of the segmented scoring line 104 that extends over the first lateral edge 12 portion of the glass web 10. Similarly, the third scoring mechanism 102-3 may operate to produce a section of the segmented scoring line 104 that extends from within the central section 16 of the glass web 10 toward the second lateral edge 14 of the glass web 10 (as may be employed in the configuration of FIG. 1A). Alternatively, if the second lateral edge 142 (and associated zone) is already separated from the central section 16, as in FIG. 1B, then the third scoring mechanism 102-3 may operate to produce a section of the segmented scoring line 104 that extends over the second lateral edge 12 portion of the glass web 10. Finally, the second scoring mechanism 102-2 may operate to produce a section of the segmented scoring line 104 that extends over the central section 16 of the glass web 10. In a preferred embodiment, the second scoring mechanism 102-2 may include a pair of scoring heads 106 that initiate the scoring line 104 at a central portion of the central section 16 and move simultaneously outward therefrom, toward the lateral edges 12, 14.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

For example: a conveyor belt may be used instead of rollers to dampen vibrations; a conveyor belt may be used to support the glass instead of the fluid bars or other non-contact conveyance mechanisms to promote additional vibration dampening.

By way of additional example, although the portion 10*i* in FIG. 2B is shown as being separated from the glass web 10 on the same horizontal elevation as portion 16*i*, such need not be the case in certain embodiments. Instead, the portion 10*i* (12*i*, 14*i*) may be allowed to bend to a lower horizontal elevation (or be raised to a higher horizontal elevation) before it is scored and separated from portion 10. That is, portion 12 and or portion 14 of FIG. 1C may be allowed to drop to a lower elevation than portion 16 before score line 104 is formed therein. Accordingly, portions 12-1 to 12-3 and/or portions 14-1 to 14-3 will be separated The various features described above may be combined in any and all combinations as, for example, according to the following aspects.

According to a first aspect, there is provided a method of separating a glass web, the glass web having a length, a width that is transverse to the length, and a thickness, the method comprising:

(a) scoring the glass web in a direction of the width thereof to produce a score line having a plurality of separated score segments, thereby defining a section of the glass web between the score line and a leading edge of the glass web;

(b) conveying the glass web from the scoring toward a destination in a transport direction parallel to the length of the glass web to a bending zone;

(c) supporting the glass web, at the bending zone, such that an increasing portion of the section of the glass web becomes cantilevered as the glass web is conveyed and the portion of the section of the glass web is permitted to droop under gravity, and continuing the conveying such that the portion of the section of the glass web is sufficiently large to generate stress in the respective score segments and drive respective cracks through the thickness of the glass web;

(d) permitting the section of the glass web to separate from the glass web along the score line; and (e) repeating steps (a) through (e) to produce a plurality of sections of glass web.

According to a second aspect, there is provided the method of aspect 1, wherein:

the step of conveying the glass web includes continuously conveying the glass web; and the step of scoring the glass web includes producing the score line simultaneously with the conveyance of the glass web.

According to a third aspect, there is provided the method of aspect 1 or aspect 2, wherein at least one of:

lengths of one or more of the score segments of the score line are one of: (i) from about 2.5 to about 75 cm (about 1 to about 30 inches); (ii) from about 5 to about 50 cm (about 2 to about 20 inches); (iii) from about 7.5 to about 25 cm (about 3 to about 10 inches); and (iv) from about 10 to about 20 cm (about 4-8 inches); and lengths of one or more intervals between respective score segments of the score line are one of: (i) from about 2.5 to about 75 cm (about 1 to about 30 inches); (ii) from about 5 to about 50 cm (about 2 to about 20 inches); (iii) from about 7.5 to about 25 cm (about 3 to about 10 inches); and (iv) from about 10 to about 20 cm (about 4-8 inches).

According to a fourth aspect, there is provided the method of any one of aspects 1-3, wherein depths of one or more of the score segments of the score line are one of: (i) from about 2 to about 20 um; (ii) from about 5 to about 15 um; (iii) about 10 um; and (iv) from about 2 to about 40% of the thickness of the glass web.

According to a fifth aspect, there is provided the method of any one of aspects 1-4, wherein the thickness of the glass web is one of: (i) about 50 um or greater; (ii) from about 100 um to about 500 um; (iii) from about 100 um to about 350 um; (iv) about 100 um; and (v) from about 50 um to about 100 um.

According to a sixth aspect, there is provided the method of any one of aspects 1-5, wherein the glass web is a fusion formed glass web.

According to a seventh aspect, there is provided the method of any one of aspects 1-6, wherein the glass web includes at least one of:

a first undesired lateral edge and associated lateral zone along one edge of the glass web;

a second undesired lateral edge and associated lateral zone along an opposing edge of the glass web; and a central zone disposed adjacent to at least one of the first and second undesired lateral edges and associated lateral zones.

According to an eighth aspect, there is provided the method of aspect 7, wherein:

the glass web includes the first and second undesired lateral edges and associated lateral zones, and the central zone disposed between the first and second undesired lateral edges;

the step of scoring includes scoring each of the first and second undesired lateral edges and associated lateral zones, and the central zone such that the section of the glass web between the score line and the leading edge of the glass web is an integral section having: (i) a section of the first undesired lateral edge and associated lateral zone; (ii) a section of the second undesired lateral edge and associated lateral zone; and (i) a section of the central zone therebetween; and the step of separating the section of the glass web from the glass web along the score line results in the separation of the integral section from the glass web.

According to a ninth aspect, there is provided the method of aspect 7, wherein:

the method further comprises, prior to the step of scoring, separating the respective first and second undesired lateral edges and associated lateral zones, from the central zone of the glass web;

the step of scoring includes scoring each of the first and second undesired lateral edges and associated lateral zones, and the central zone, such that the section of the glass web between the score line and the leading edge of the glass web includes three separate sub-sections having: (i) a sub-section of the first undesired lateral edge and associated lateral zone; (ii) a sub-section of the second undesired lateral edge and associated lateral zone; and (i) a sub-section of the central zone;

the step of conveying the glass web includes conveying all three separate sub-sections of the glass web simultaneously to the bending zone; and the step of separating the three sub-sections of the glass web from the glass web along the score line results in the separation of the three separated sub-sections from the glass web.

According to a tenth aspect, there is provided the method of aspect 7, wherein:

the method further comprises, prior to the step of scoring, separating the respective first and second undesired lateral edges and associated lateral zones, from the central zone of the glass web;

the step of scoring includes scoring each of the first and second undesired lateral edges and associated lateral zones, but not the central zone, such that the section of the glass web between the score line and the leading edge of the glass web includes two separate sub-sections having: (i) a sub-section of the first undesired lateral edge and associated lateral zone; (ii) a sub-section of the second undesired lateral edge and associated lateral zone; and (i) no sub-section of the central zone;

the step of conveying the glass web includes conveying the two separate sub-sections and the central zone of the glass web simultaneously to the bending zone; and the step of separating includes separation of only the two sub-sections from the glass web along the score line, and a continuous sheet of the central zone remaining connected to the glass web.

According to an eleventh aspect, there is provided an apparatus for processing a glass web, the glass web having a length, a width that is transverse to the length, and a thickness, the apparatus comprising:

a transport mechanism configured to convey the glass web from a glass web source toward a destination in a transport direction parallel to the length of the glass web;

a scoring mechanism configured to score the glass web in a direction of the width thereof to produce a score line having a plurality of separated score segments, thereby defining a section of the glass web between the score line and a leading edge of the glass web;

a support mechanism configured to support the glass web, at a bending zone, such that an increasing portion of the section of the glass web becomes cantilevered as the glass web is conveyed by the transport mechanism and the portion of the section of the glass web is permitted to droop under gravity, and continuing the conveying such that the portion of the section of the glass web is sufficiently large to generate stress in the respective score segments and drive respective cracks through the thickness of the glass web;

a separating zone configured to permit the section of the glass web to separate from the glass web along the score line; and a controller configured to repeat the conveying, scoring, supporting, and separating to produce a plurality of sections of glass web.

According to a twelfth aspect, there is provided the apparatus of aspect 11, wherein:

the transport mechanism is configured to convey the glass web continuously; and the scoring mechanism is configured to score the glass web and to produce the score line simultaneously with the conveyance of the glass web.

According to a thirteenth aspect, there is provided the apparatus of aspect 11 or aspect 12, wherein the scoring mechanism is configured such that at least one of:

lengths of one or more of the score segments of the score line are one of: (i) from about 2.5 to about 75 cm (about 1 to about 30 inches); (ii) from about 5 to about 50 cm (about 2 to about 20 inches); (iii) from about 7.5 to about 25 cm (about 3 to about 10 inches); and (iv) from about 10 to about 20 cm (about 4-8 inches); and lengths of one or more intervals between respective score segments of the score line are one of: (i) from about 2.5 to about 75 cm (about 1 to about 30 inches); (ii) from about 5 to about 50 cm (about 2 to about 20 inches); (iii) from about 7.5 to about 25 cm (about 3 to about 10 inches); and (iv) from about 10 to about 20 cm (about 4-8 inches).

According to a fourteenth aspect, there is provided the apparatus of any one of aspects 11-13, wherein the scoring mechanism is configured such that depths of one or more of the score segments of the score line are one of: (i) from about 2 to about 20 um; (ii) from about 5 to about 15 um; (iii) about 10 um; (iv) from about 2 to about 40% of the thickness of the glass web.

According to a fifteenth aspect, there is provided the apparatus of any one of aspects 11-14, wherein the thickness of the glass web is one of: (i) about 50 um or greater; (ii) from about 100 um to about 500 um; (iii) from about 100 um to about 350 um; (iv) about 100 um; and (v) from about 50 um to about 100 um.

According to a sixteenth aspect, there is provided the apparatus of any one of aspects 11-15, wherein the glass web is a fusion formed glass web.

According to a seventeenth aspect, there is provided the apparatus of any one of aspects 11-16, wherein the glass web includes at least one of:

a first undesired lateral edge and associated lateral zone along one edge of the glass web;

a second undesired lateral edge and associated lateral zone along an opposing edge of the glass web; and a central zone disposed adjacent to at least one of the first and second undesired lateral edges and associated lateral zones.

According to a eighteenth aspect, there is provided the apparatus of aspect 17, wherein:

the glass web includes the first and second undesired lateral edges and associated lateral zones, and the central zone disposed between the first and second undesired lateral edges;

the scoring mechanism is configured to score each of the first and second undesired lateral edges and associated lateral zones, and the central zone such that the section of the glass web between the score line and the leading edge of the glass web is an integral section having: (i) a section of the first undesired lateral edge and associated lateral zone; (ii) a section of the second undesired lateral edge and associated lateral zone; and (i) a section of the central zone therebetween; and the separating zone is configured such that the separation results in the separation of the integral section from the glass web.

According to a nineteenth aspect, there is provided the apparatus of aspect 17, wherein:

the apparatus operates to, prior to scoring, separate the respective first and second undesired lateral edges and associated lateral zones, from the central zone of the glass web;

the scoring mechanism is configured to score each of the first and second undesired lateral edges and associated lateral zones, and the central zone, such that the section of the glass web between the score line and the leading edge of the glass web includes three separate sub-sections having: (i) a sub-section of the first undesired lateral edge and associated lateral zone; (ii) a sub-section of the second undesired lateral edge and associated lateral zone; and (i) a sub-section of the central zone;

the transport mechanism is configured to convey all three separate sub-sections of the glass web simultaneously to the bending zone; and the separating zone is configured such that the separation results in the separation of the three separated sub-sections from the glass web.

According to a twentieth aspect, there is provided the apparatus of aspect 17, wherein:

the apparatus operates to, prior to scoring, separate the respective first and second undesired lateral edges and associated lateral zones, from the central zone of the glass web;

the scoring mechanism is configured to score each of the first and second undesired lateral edges and associated lateral zones, but not the central zone, such that the section of the glass web between the score line and the leading edge of the glass web includes two separate sub-sections having: (i) a sub-section of the first undesired lateral edge and associated lateral zone; (ii) a sub-section of the second undesired lateral edge and associated lateral zone; and (i) no sub-section of the central zone;

the transport mechanism is configured to convey the two separate sub-sections and the central zone of the glass web simultaneously to the bending zone; and the separating zone is configured such that the separation results in the separation of only the two sub-sections from the glass web along the score line, and a continuous sheet of the central zone remaining connected to the glass web.

The invention claimed is:

1. An apparatus for processing a glass web, the glass web having a length, a width that is transverse to the length, and a thickness, the apparatus comprising:
   a transport mechanism configured to convey the glass web from a glass web source toward a destination in a transport direction parallel to the length of the glass web;
   a scoring mechanism configured to score the glass web in a direction of the width thereof to produce a score line having a plurality of separated score segments, thereby defining a section of the glass web between the score line and a leading edge of the glass web;
   a support mechanism configured to support the glass web, at a bending zone, such that an increasing portion of the section of the glass web becomes cantilevered as the glass web is conveyed by the transport mechanism and the portion of the section of the glass web is permitted to droop under gravity, and continuing the conveying such that the portion of the section of the glass web is sufficiently large to generate stress in the respective separated score segments and drive respective cracks through the thickness of the glass web;
   a separating zone configured to permit the section of the glass web to separate from the glass web along the score line;
   a controller configured to control the transport mechanism, scoring mechanism, and separating zone to produce a plurality of sections of glass web; and
   wherein the scoring mechanism is configured to produce, for at least one of the plurality of separated score segments, a path through the glass web comprising a first slope relative to a surface of the glass web and a second slope relative to the surface of the glass web wherein a magnitude of the first slope is different from a magnitude of the second slope.

2. The apparatus of claim 1, wherein:
the transport mechanism is configured to convey the glass web continuously; and the scoring mechanism is configured to score the glass web and to produce the score line simultaneously with the conveyance of the glass web.

3. The apparatus of claim 1, wherein the scoring mechanism is configured such that depths of one or more of the plurality of separated score segments of the score line are one of:
   (i) from about 2 to about 20 um;
   (ii) from about 5 to about 15 um;
   (iii) about 10 um; and
   (iv) from about 2% to about 40% of the thickness of the glass web.

4. The apparatus of claim 1, wherein the thickness of the glass web is one of:
   (i) about 50 um or greater;
   (ii) from about 100 um to about 500 um;
   (iii) from about 100 um to about 350 um;
   (iv) about 100 um; and
   (v) from about 50 um to about 100 um.

5. The apparatus of claim 1, wherein the apparatus is configured for a fusion formed glass web.

6. The apparatus of claim 1, wherein the apparatus is configured for a glass web including at least one of:
   a first undesired lateral edge and associated lateral zone along one edge of the glass web;
   a second undesired lateral edge and associated lateral zone along an opposing edge of the glass web; and
   a central zone disposed adjacent to at least one of the first and second undesired lateral edges and associated lateral zones.

7. The apparatus of claim 6, wherein:
the glass web includes the first and second undesired lateral edges and associated lateral zones, and the central zone disposed between the first and second undesired lateral edges;
the scoring mechanism is configured to score each of the first and second undesired lateral edges and associated lateral zones, and the central zone such that the section of the glass web between the score line and the leading edge of the glass web is an integral section having:
   (i) a section of the first undesired lateral edge and associated lateral zone;
   (ii) a section of the second undesired lateral edge and associated lateral zone; and
   (iii) a section of the central zone therebetween; and
the separating zone is configured such that the separation results in the separation of the integral section from the glass web.

8. The apparatus of claim 6, wherein:
the apparatus operates to, prior to scoring, separate the respective first and second undesired lateral edges and associated lateral zones, from the central zone of the glass web;
the scoring mechanism is configured to score each of the first and second undesired lateral edges and associated lateral zones, and the central zone, such that the section of the glass web between the score line and the leading edge of the glass web includes three separate sub-sections having:
   (i) a sub-section of the first undesired lateral edge and associated lateral zone;
   (ii) a sub-section of the second undesired lateral edge and associated lateral zone; and
   (iii) a sub-section of the central zone;
the transport mechanism is configured to convey all three separate sub-sections of the glass web simultaneously to the bending zone; and the separating zone is configured such that the separation results in the separation of the three separated sub-sections from the glass web.

9. The apparatus of claim 6, wherein:
the apparatus operates to, prior to scoring, separate the respective first and second undesired lateral edges and associated lateral zones, from the central zone of the glass web;
the scoring mechanism is configured to score each of the first and second undesired lateral edges and associated lateral zones, but not the central zone, such that the section of the glass web between the score line and the leading edge of the glass web includes two separate sub-sections having:
(i) a sub-section of the first undesired lateral edge and associated lateral zone;
(ii) a sub-section of the second undesired lateral edge and associated lateral zone; and
(iii) no sub-section of the central zone;
the transport mechanism is configured to convey the two separate sub-sections and the central zone of the glass web simultaneously to the bending zone; and
the separating zone is configured such that the separation results in the separation of only the two sub-sections from the glass web along the score line, and a continuous sheet of the central zone remaining connected to the glass web.

10. The apparatus of claim 1, wherein the scoring mechanism is configured such that lengths of one or more intervals between respective separated score segments of the score line are from about 1 to about 30 inches.

11. The apparatus of claim 10, wherein the scoring mechanism is configured such that lengths of one or more of the plurality of separated score segments of the score line are from about 1 to about 30 inches.

12. The apparatus of claim 1, wherein the scoring mechanism is configured such that lengths of one or more intervals between respective separated score segments of the score line are from about 4-8 inches.

13. The apparatus of claim 12, wherein the scoring mechanism is configured such that lengths of one or more of the plurality of separated score segments of the score line are from about 1 to about 30 inches.

14. The apparatus of claim 1, comprising a plurality of scoring mechanisms, wherein at least one of the scoring mechanisms is configured to score the glass web in the direction of the width thereof to produce the score line defining the section of the glass web between the score line and the leading edge of the glass web.

15. The apparatus of claim 1, wherein the plurality of scoring mechanisms includes three independent scoring mechanisms.

16. An apparatus for processing a glass web, the glass web having a length, a width that is transverse to the length, and a thickness, the apparatus comprising:
a transport mechanism configured to convey the glass web from a glass web source toward a destination in a transport direction parallel to the length of the glass web;
a scoring mechanism configured to score the glass web in a direction of the width thereof to produce a score line having a plurality of separated score segments, thereby defining a section of the glass web between the score line and a leading edge of the glass web;
a support mechanism configured to support the glass web, at a bending zone, such that an increasing portion of the section of the glass web becomes cantilevered as the glass web is conveyed by the transport mechanism and the portion of the section of the glass web is permitted to droop under gravity, and continuing the conveying such that the portion of the section of the glass web is sufficiently large to generate stress in the respective separated score segments and drive respective cracks through the thickness of the glass web;
a separating zone configured to permit the section of the glass web to separate from the glass web along the score line; and
a controller configured to control the transport mechanism, scoring mechanism, and separating zone to produce a plurality of sections of glass web;
wherein the scoring mechanism is configured such that lengths of one or more intervals between respective separated score segments of the score line are from about 1 to about 30 inches.

17. The apparatus of claim 16, wherein the scoring mechanism is configured such that lengths of one or more intervals between respective score segments of the score line are from about 4-8 inches.

18. The apparatus of claim 17, wherein the scoring mechanism is configured such that lengths of one or more of the plurality of separated score segments of the score line are from about 1 to about 30 inches.

19. The apparatus of claim 16, wherein the scoring mechanism is configured such that lengths of one or more of the plurality of separated score segments of the score line are from about 1 to about 30 inches.

* * * * *

UNITED STATES PATENT AND TRADEMARK OFFICE
CERTIFICATE OF CORRECTION

PATENT NO. : 10,494,289 B2
APPLICATION NO. : 15/547224
DATED : December 3, 2019
INVENTOR(S) : Robertson Dewhurst Booth et al.

It is certified that error appears in the above-identified patent and that said Letters Patent is hereby corrected as shown below:

On the Title Page

On page 2, in Column 1, item (56), U.S. Patent Documents, Line 9, delete "Collier" and insert -- Gollier --, therefor.

Signed and Sealed this
Third Day of March, 2020

Andrei Iancu
*Director of the United States Patent and Trademark Office*